(No Model.)
J. W. HAWORTH.
METALLIC FELLY FOR WHEELS.
No. 334,949. Patented Jan. 26, 1886.
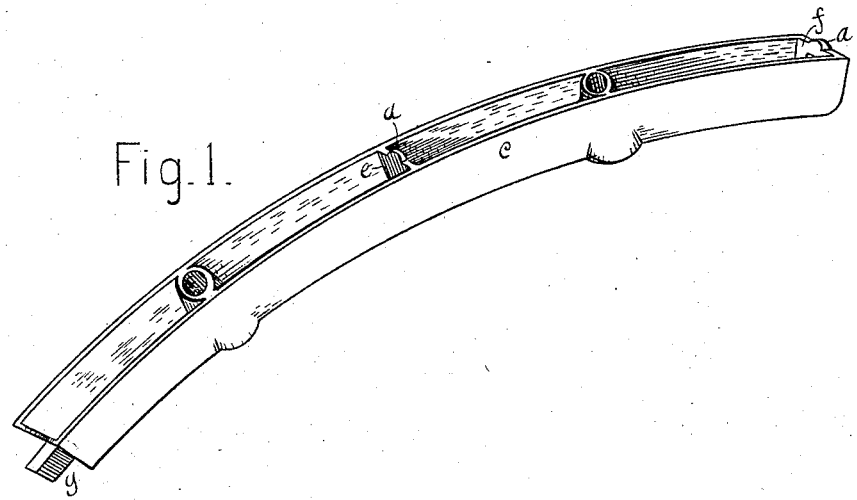
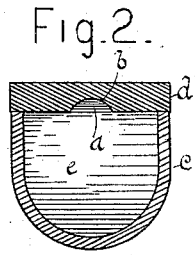
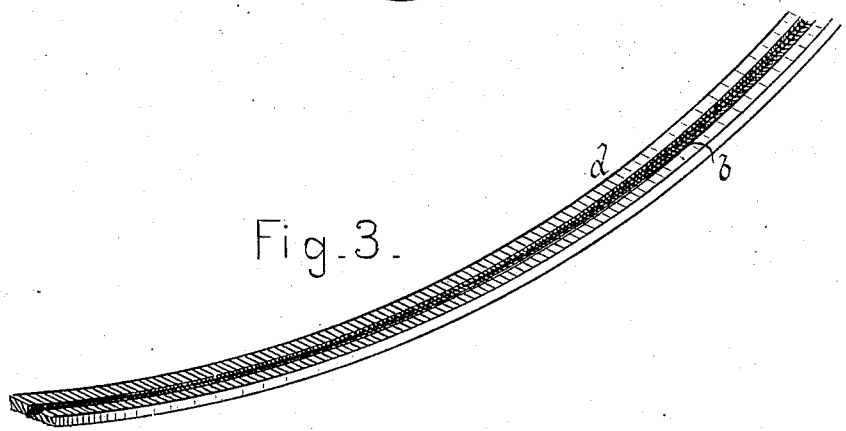
Witnesses.
Chas. M. Allison
L. F. Henkle.
Inventor.
J. W. Haworth
By L. S. Graham,
Atty.

UNITED STATES PATENT OFFICE.

JAMES W. HAWORTH, OF DECATUR, ILLINOIS.

METALLIC FELLY FOR WHEELS.

SPECIFICATION forming part of Letters Patent No. 334,949, dated January 26, 1886.

Application filed November 10, 1885. Serial No. 182,354. (No model.)

*To all whom it may concern:*

Be it known that I, JAMES W. HAWORTH, a resident of the city of Decatur, county of Macon, and State of Illinois, have invented certain new and useful Improvements in Metallic Felly-Wheels, of which the following is a specification.

The object of my invention is to produce a tire and felly that will, under ordinary circumstances, be entirely inseparable, thus avoiding the inconvenience of the constant resetting that is necessary in wheels as ordinarily constructed.

In the drawings, accompanying and forming a part of this specification, Figure 1 is a perspective view of a section of felly constructed in accordance with my invention. Fig. 2 is a transverse view of the tire and felly, and Fig. 3 is a perspective view of a broken section of tire.

$a$ represents embossments on the periphery of the felly, preferably located at the center of each section and at the junctions thereof.

$b$ indicates a longitudinal concavity in the inner surface of tire $d$.

$c$ is a metallic felly-section, having tenon $g$, slotted end plate, $f$, and central brace, $e$.

A complete felly is composed of a number of sections, as shown in Fig. 1, the tenon of one section penetrating the slotted plate of the next adjacent section, and thereby providing an embossment at each junction.

As the expansion and contraction of the tire and felly are uniform, and as neither are subject to permanent shrinkage, it is evident that when the tire is once in position, with the embossments of the felly engaging the concavity of the tire, subsequent displacement by ordinary use is practically an impossibility.

I claim as new and desire to secure by Letters Patent—

In wheels, the combination of felly $c$, concave in cross-section, cross-braces $e f$, embossments $a$ on braces $e f$, and tire $d$, having longitudinal concavity $b$, as and for the purpose set forth.

In testimony whereof I sign my name in the presence of two subscribing witnesses.

JAMES W. HAWORTH.

Attest:
 CHAS. M. ALLISON,
 L. F. HENKLE.